US011061692B2

(12) United States Patent
Rothman et al.

(10) Patent No.: US 11,061,692 B2
(45) Date of Patent: Jul. 13, 2021

(54) LOW LATENCY BOOT FROM ZERO-POWER STATE

(71) Applicant: Intel Corporation, Santa Clara, CA (US)

(72) Inventors: Michael Rothman, Puyallup, WA (US); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 15/891,124

(22) Filed: Feb. 7, 2018

(65) Prior Publication Data

US 2019/0042279 A1 Feb. 7, 2019

(51) Int. Cl.
*G06F 1/32* (2019.01)
*G06F 9/44* (2018.01)
*G06F 9/4401* (2018.01)
*G06F 1/3287* (2019.01)
*G06F 1/3225* (2019.01)
*G06F 1/3206* (2019.01)
*G06F 1/3234* (2019.01)

(52) U.S. Cl.
CPC .......... *G06F 9/4418* (2013.01); *G06F 1/3206* (2013.01); *G06F 1/3225* (2013.01); *G06F 1/3234* (2013.01); *G06F 1/3287* (2013.01)

(58) Field of Classification Search
None
See application file for complete search history.

(56) References Cited

U.S. PATENT DOCUMENTS

| 8,499,174 | B2 * | 7/2013 | Lai | G06F 1/3203 713/300 |
| 8,612,676 | B2 | 12/2013 | Dahlen et al. | |
| 9,829,951 | B2 * | 11/2017 | Kumar | G06F 1/3275 |
| 2008/0065845 | A1 * | 3/2008 | Montero | G06F 1/3225 711/162 |
| 2008/0270811 | A1 * | 10/2008 | Chow | G06F 1/32 713/323 |
| 2009/0172439 | A1 * | 7/2009 | Cooper | G06F 1/3203 713/323 |
| 2010/0064159 | A1 * | 3/2010 | Wu | G06F 1/3203 713/323 |
| 2013/0283079 | A1 * | 10/2013 | Puthiyedath | G06F 1/3234 713/323 |
| 2013/0290759 | A1 * | 10/2013 | Kumar | G06F 1/3275 713/323 |
| 2013/0290760 | A1 * | 10/2013 | Cooper | G06F 1/3203 713/323 |

(Continued)

OTHER PUBLICATIONS

Indian Office Action for Patent Application No. 201944001061, dated Feb. 19, 2021, 6 pages.

*Primary Examiner* — Jaweed A Abbaszadeh
*Assistant Examiner* — Cheri L Harrington
(74) *Attorney, Agent, or Firm* — Jordan IP Law, LLC

(57) ABSTRACT

An embodiment of a semiconductor package apparatus may include technology to determine if a wake event corresponds to a zero-power state of a computer operating system, determine if a run-time state is valid to wake the operating system from the zero-power state, and wake the operating system from the zero-power state to the run-time state if the run-time state is determined to be valid. Other embodiments are disclosed and claimed.

22 Claims, 10 Drawing Sheets

(56) References Cited

U.S. PATENT DOCUMENTS

| | | | |
|---|---|---|---|
| 2014/0068302 A1* | 3/2014 | Falik | G06F 1/3206 |
| | | | 713/323 |
| 2014/0317429 A1* | 10/2014 | Wang | G06F 1/1694 |
| | | | 713/323 |
| 2017/0308154 A1* | 10/2017 | Young | G06F 9/4401 |
| 2019/0163256 A1* | 5/2019 | Lewis | G06F 1/3287 |

* cited by examiner

US 11,061,692 B2

LOW LATENCY BOOT FROM ZERO-POWER STATE

TECHNICAL FIELD

Embodiments generally relate to computing devices. More particularly, embodiments relate to a low latency boot from zero-power state.

BACKGROUND

Computing systems or platforms may utilize various memory arrangements. A two-level memory (2LM) system may include near memory (NM) and far memory (FM). Boot time may refer to an amount of time between a power transition and when control is transferred to an operating system (OS). In general, faster boot times are preferred.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
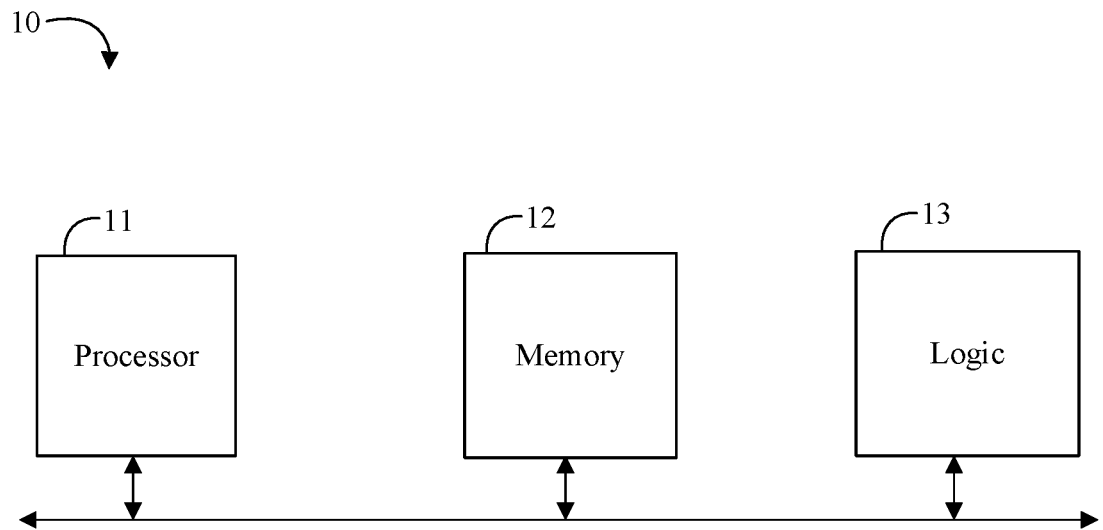
FIG. 1 is a block diagram of an example of an electronic processing system according to an embodiment.

Many computing devices include a boot process, which may refer to the process of taking the machine from a zero-power state or a low-power state to a run-time state where the device is ready to be used for its intended purpose. For a vertically integrated device (e.g., where the manufacturer provides both the hardware and the software for the device), the boot process may be relatively closed off because the manufacturer controls all aspects of how the hardware and software need to operate together. For a horizontally integrated device (e.g., where the manufacturer provides only a portion of the hardware and/or software for the device), the boot process may be more open because other hardware and/or software providers may need to understand the process for bringing the device from a zero/low power state to a run-time state so that the provided hardware/software works following the boot process. Accordingly, a horizontally integrated product may provide more hooks or indicators (e.g., such as a wake vector) as part of the boot process.

For either vertically or horizontally integrated devices, some embodiments may reduce or eliminate the need for the boot process. For example, some embodiments may include non-volatile memory that fully supports the run-time state. Some embodiments may inherently always operate in a run-time state that is valid or may provide an indicator or a flag that may indicate the run-time state is valid. Accordingly, when the device is powered down, placed in a low-power state, or placed in a suspended state, the run-time state may always be sufficiently preserved such that when the device wakes (e.g., when power is restored, a button is pressed, a lid is opened, or some other action indicates that the device should return to the run-time state) the device may simply resume operation. For example, some embodiments may determine that the run-time is valid based on an indication of successful power-up/operation of the device's components/parts. In some embodiments, the device may read a flag that indicates that the run-time state is valid. Advantageously, some embodiments of a device with non-volatile memory fully supporting the run-time state may appear to be ready for operation substantially instantaneously after being turned on from a zero-power state (e.g., comparable to be resumed from a low-power/suspended state).

For some embodiments (e.g., for legacy compatibility), the device may still follow a boot process but may proceed to boot much faster by bypassing some traditional boot processes. For example, some devices may include both volatile and non-volatile memory involved in the run-time state. Some embodiments may flush the volatile memory to non-volatile before transitioning to the zero-power state, such that the run-time state may be quickly restored when waking from the zero-power state. During run-time, a flag may indicate that the run-time state is not valid to wake from the zero-power state. When transitioning to the zero-power state, if the volatile memory is successfully flushed to the non-volatile memory the flag may be set to indicate that the run-time state is valid to wake from the zero-power state.

Some embodiments may advantageously provide a zero-power low latency boot flow on 2LM machines. In some systems, an ADVANCED CONFIGURATION AND POWER INTERFACE (ACPI) S3 system state may provide a low-power suspend with a very fast resume on a computing device. The S3 low-power state may be very different from zero-power system states such as the S4 and/or S5 states (e.g., in terms of power consumption). In some applications (e.g., automotive applications, mobile applications, etc.), zero-power may be an important requirement (e.g., to reduce or eliminate battery drain). Some systems may support a system connected standby (CS) state. For example, when a MICROSOFT WINDOWS operating system is installed on a CS-enabled platform, the platform may not support S3. The S-state transitions provided may include an S0ix (connected standby) state, the S4 state, and the S5 state (e.g., the latter two being zero-power states). In some other systems, transitioning from the S4 and/or S5 state to a normal operating state may involve lengthy resume times. Advantageously, some embodiments may provide very fast wakeup of a 2LM machine from a zero-power state.

Some embodiments may enable a resume from the zero-power state in a resume time of less than 5 seconds, and some embodiments may enable a resume time of less than 2 seconds (e.g., comparable to resume times from a low-power state). For example, some embodiments may support a zero-power state that maintains the ability to wake the system and have the system be completely usable in less than 5 seconds (e.g., as measured from a CPU reset to the OS initialization complete). Advantageously, embodiments of such faster boot flows may apply to a wide class of computing devices including, for example, personal computers, servers, clients, mobile devices, etc. Some embodiments for automotive applications may support a zero-power state that maintains the ability to wake the system and have the system be usable in less than 2 seconds (e.g., as measured from the time the ignition is turned on and power is supplied to the embedded vehicle computer (e.g., navigation/infotainment system) and when the reverse-view camera is displaying an image). Advantageously, some embodiments may provide a boot flow which is both low latency and zero-power (e.g., with zero extra drain of the battery being caused by the computing device).

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

Turning now to FIG. 1, an embodiment of an electronic processing system 10 may include a processor 11, memory 12 communicatively coupled to the processor 11, and logic 13 communicatively coupled to the processor 11 to determine if a wake event corresponds to a zero-power state (e.g., of an operating system (OS) of the electronic processing system 10), determine if a run-time state is valid to wake from the zero-power state, and wake from the zero-power state to the run-time state if the run-time state is determined to be valid. For example, the logic 13 may be configured to determine if a wake vector is available (e.g., the wake vector including information related to a transition of the OS to the zero-power state), and wake the OS from the zero-power state based on the wake vector, if the wake vector is determined to be available. In some embodiments, the logic 13 may be configured to replay an initialization sequence from the zero-power state, if the wake vector is determined to be available. In some embodiments, the logic 13 may be further configured to determine if the memory 12 includes a multi-level memory with at least one level of non-volatile memory (NVM). For example, the logic 13 may also be configured to receive an indication of a transition to a zero-power state, and create the wake vector, if the memory 12 is determined to include the multi-level memory with at least one level of NVM. In some embodiments, the logic 13 may be further configured to initiate a flush of volatile memory to the NVM of the multi-level memory based on the received indication of the transition to the zero-power state. For example, the NVM may include PCM (e.g., 3D crosspoint memory such as INTEL 3D XPOINT memory). In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining if the wake event is from the zero-power state, determining if the run-time state is valid, waking to the run-time state from the zero-power state, etc.).

Figure 2:
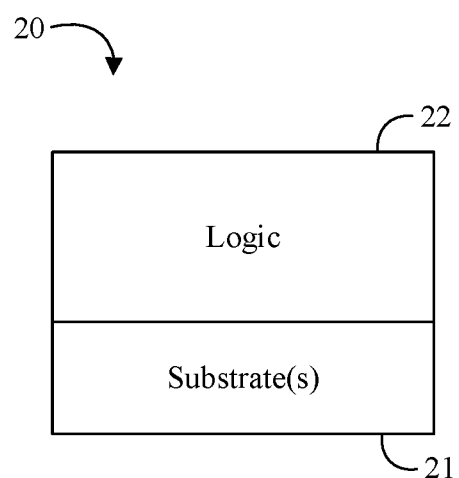
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine if a wake event corresponds to a zero-power state (e.g., of an OS), determine if a run-time state is valid to wake from the zero-power state, and wake from the zero-power state to the run-time state if the run-time state is determined to be valid. For example, the logic 22 may be configured to determine if a wake vector is available (e.g., the wake vector including information related to a transition of the OS to the zero-power state), and wake the OS from the zero-power state based on the wake vector, if the wake vector is determined to be available. In some embodiments, the logic 22 may be configured to replay an initialization sequence from the zero-power state, if the wake vector is determined to be available. In some embodiments, the logic 22 may be further configured to determine if a system memory includes a multi-level memory with at least one level of NVM. For example, the logic 22 may also be configured to receive an indication of a transition to a zero-power state, and create the wake vector, if the system memory is determined to include the multi-level memory with at least one level of NVM. In some embodiments, the logic 22 may be further configured to initiate a flush of volatile memory to the NVM of the multi-level memory based on the received indication of the transition to the zero-power state. For example, the NVM may include PCM. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 28 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
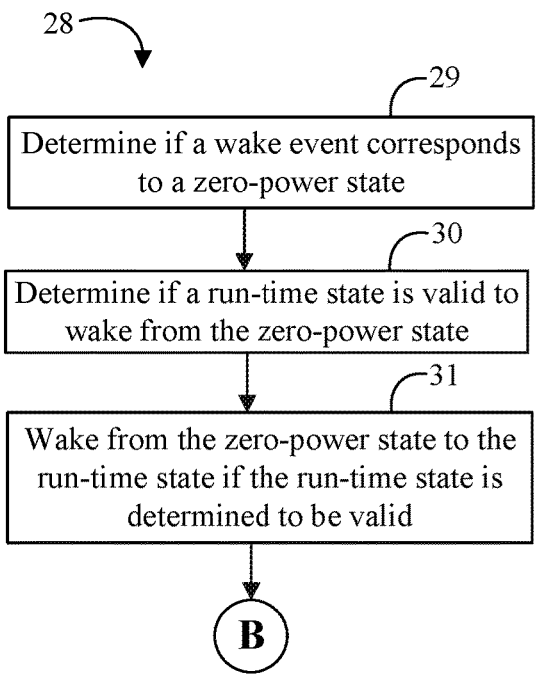
FIGS. 3A to 3C are flowcharts of an example of a method of waking an operating system according to an embodiment.
Figure 3B:
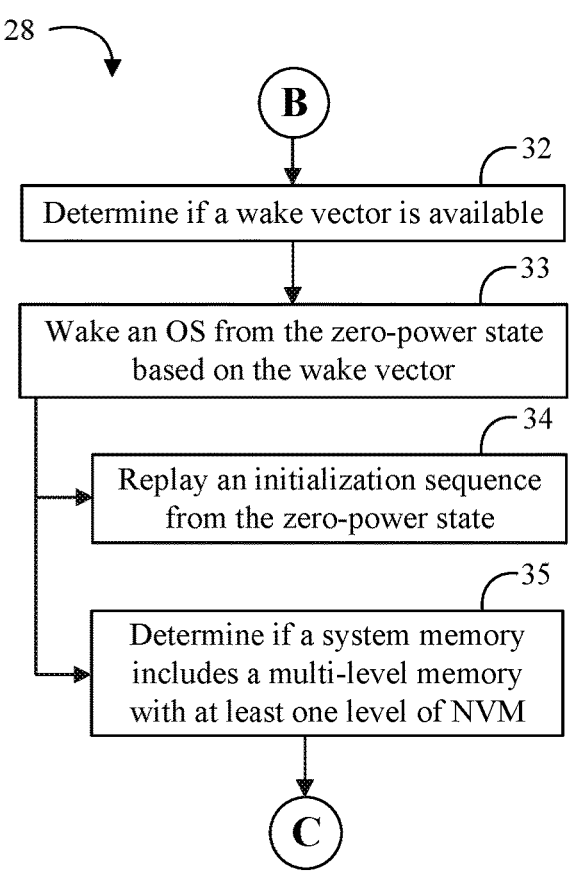
Figure 3C:
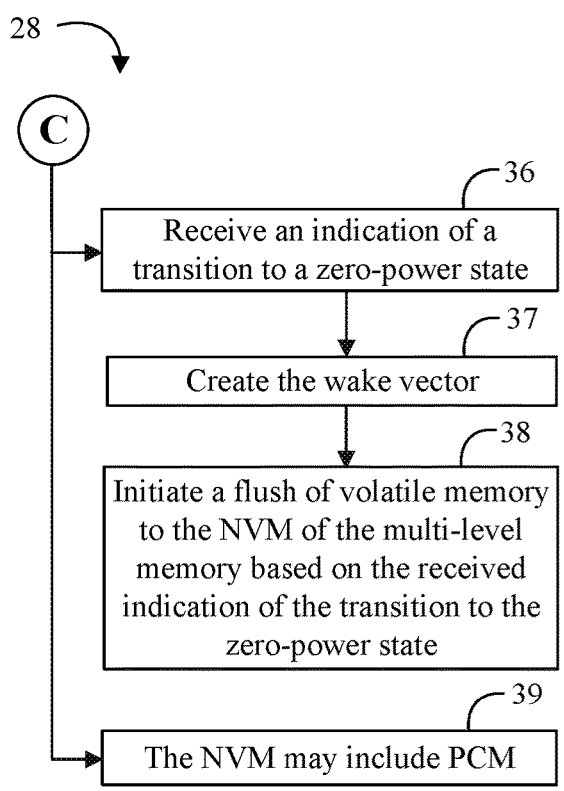

Turning now to FIGS. 3A to 3C, an embodiment of a method 28 of waking an OS may include determining if a wake event corresponds to a zero-power state at block 29 (e.g., a zero-power state of an OS), determining if a run-time state is valid to wake from the zero-power state at block 30, and waking from the zero-power state to the run-time state if the run-time state is determined to be valid at block 31. For example, the method 28 may include determining if a wake vector is available at block 32 (e.g., the wake vector including information related to a transition of the OS to the zero-power state), and waking the OS from the zero-power state based on the wake vector at block 33, if the wake vector is determined to be available. Some embodiments of the method 28 may include replaying an initialization sequence from the zero-power state at block 34, if the wake vector is determined to be available. Some embodiments of the method 28 may also include determining if a system memory includes a multi-level memory with at least one level of NVM at block 35. For example, the method 28 may include receiving an indication of a transition to a zero-power state at block 36, and creating the wake vector at block 37, if the system memory is determined to include the multi-level memory with at least one level of NVM. Some embodiments of the method 28 may further include initiating a flush of volatile memory to the NVM of the multi-level memory based on the received indication of the transition to the zero-power state at block 38. For example, the NVM may include PCM at block 39.

Embodiments of the method 28 may be implemented in a system, apparatus, computer, device, etc., for example, such as those described herein. More particularly, hardware implementations of the method 28 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 28 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 28 may be implemented on a computer readable medium as described in connection with Examples 23 to 29 below. Embodiments or portions of the method 28 may be implemented in firmware, applications (e.g., through an application programming interface (API)), or driver software running on an operating system (OS).

Figure 4:
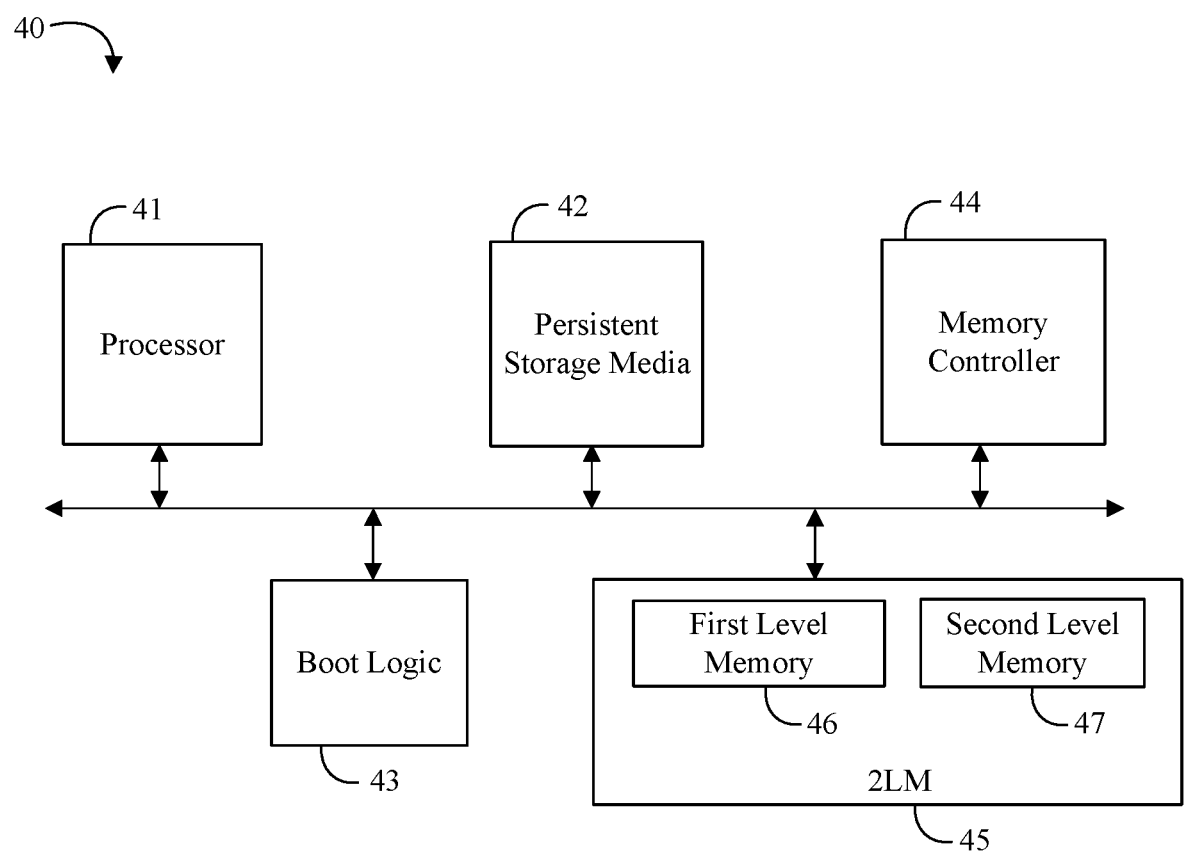
FIG. 4 is a block diagram of another example of an electronic processing system according to an embodiment.

Turning now to FIG. 4, some embodiments may be physically or logically arranged as one or more modules or components. For example, an embodiment of an electronic processing system 40 may include a processor 41, persistent storage media 42 (e.g., a hard disk drive (HDD), a solid state drive (SSD), etc.) communicatively coupled to the processor 41, boot logic 43 communicatively coupled to the processor, and a memory controller 44 communicatively coupled to the processor 41 and the boot logic 43. The memory controller 44 may also be communicatively coupled to a two-level memory (2LM) 45 including a first level memory 46 and a second level memory 47. In various embodiments, any of the first level memory 46 and the second level memory 47 may include NVM and/or volatile memory. For example, the 2LM 45 may correspond to system memory or main memory having a near memory and a far memory. The first level memory 46 may correspond to the near memory and include smaller, faster DRAM. The second level memory 47 may correspond to the far memory and include larger storage capacity NVM (e.g. a byte-addressable 3D crosspoint memory). In some embodiments, the boot logic 43 may be configured to determine if a wake event corresponds to a zero-power state, determine if a wake vector is available, and wake an OS from the zero-power state based on the wake vector, if the wake vector is determined to be available.

In some embodiments, the boot logic 43 may be configured to replay an initialization sequence from the zero-power state, if the wake vector is determined to be available. In some embodiments, the boot logic 43 may be further configured to determine that the system memory includes the 2LM 45 including NVM for the second level memory 47. For example, the boot logic 43 may also be configured to receive an indication of a transition to a zero-power state, and create the wake vector (e.g., because the 2LM 45 includes NVM for the second level memory 47). In some embodiments, the boot logic 43 may be further configured to initiate a flush of the first level memory 46 (e.g., DRAM) to the second level memory 47 (e.g., NVM) of the 2LM 45 based on the received indication of the transition to the zero-power state. For example, portions or aspects of the boot logic 43 may be integrated with various other components of the system 40 (e.g., on a same die as one or more of the processor 41, the memory controller 44, etc.).

Embodiments of the processor 41, the persistent storage media 42, the boot logic 43, the memory controller 44, the 2LM 45, the first level memory 46, the second level memory 47, and other components of the system 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 5:
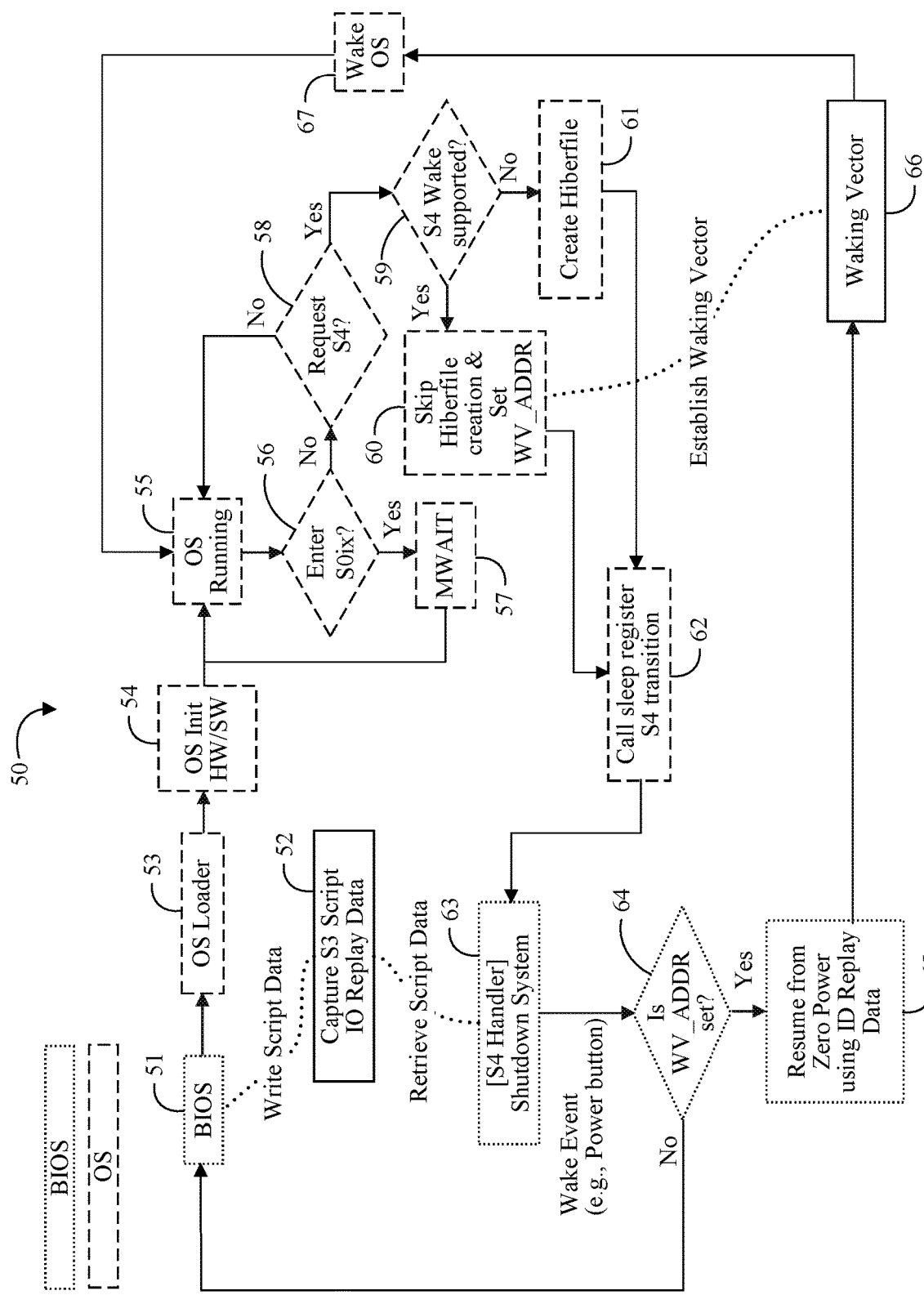
FIG. 5 is a flowchart of another example of a method of waking an operating system according to an embodiment.

Turning now to FIG. 5, an embodiment of a method 50 of booting an operating system may include portions performed by a basic input/output system (BIOS) shown in dotted lines and portions performed by the OS shown in dashed lines. When the BIOS starts at block 51 (e.g., following a wake event), the BIOS may write script data which may be captured at block 52 to keep an input/output (IO) replay database of hardware (HW) initialization sequences during normal boot. The BIOS may hand over control to an OS loader at block 53 which may perform OS initialization of the HW/SW at block 54 to place the OS into a run-time state at block 55. While the OS is running at block 55, some action or software trigger may initiate a transition to a low-power or zero-power state. The OS may then determine if the SOix (CS) state should be entered at block 56. If so, a monitor wait (MWAIT) instruction may place the OS in the low-power CS state at block 57 until the monitored condition is detected and the OS resumes running at block 55. Otherwise, the OS may determine if there was a request for S4 at block 58. If not, the OS may continue running at block 55. If so, based on OS power management (OSPM) policy and whether wake from S4 is supported at block 59, the OS may skip hiberfile creation and set an address for the waking vector to a non-zero-value at block 60 (e.g., a zero value for the S4 waking vector may indicate that wake from S4 is not available) and establish an S4 waking vector. Otherwise, the OS may create the hiberfile at block 61. Following either block 60 or block 61, the OS may call sleep register S4 transition at block 62 and the BIOS may call the S4 handler to perform the system shutdown at block 63 (e.g., which may retrieve the replay script data). After the system shuts down (e.g., S4, S5, etc.), upon a wake event (e.g., open-lid, power button, etc.), the BIOS may check the reason for the shutdown (e.g., S4), and if the address for the S4 waking vector is non-zero at block 64. If not, the BIOS may restart from block 51. If so, the BIOS may initiate memory reference code (MRC) initialization and IO replay at block 65, and may then jump to the S4 OS waking vector at block 66 to wake the OS at block 67 and place the OS into the run-time state at block 55.

Advantageously, by providing hints to the OS, some embodiments may enable the OS to bypass some of the time-consuming S4/zero-power state transitions actions (e.g. writing of the hiberfile) and establish a waking vector. In addition, in some embodiments the BIOS may leverage underlying IO HW replay support (e.g., not normally used in the S4 state) to quickly initialize the HW and then jump to a waking vector that the OS establishes. Using both of these improvements together, and by leveraging characteristics of the underlying HW (e.g., persistent media in the 2LM), some embodiments may advantageously provide a zero-power/low-latency boot flow. For example, some embodiments may allow a platform that has been placed in a zero-power state to resume in a manner similar to a platform that has simply been quiesced. Some embodiments may advantageously provide a near instant-on feel when the user opens the lid or presses the power button.

Figure 6:
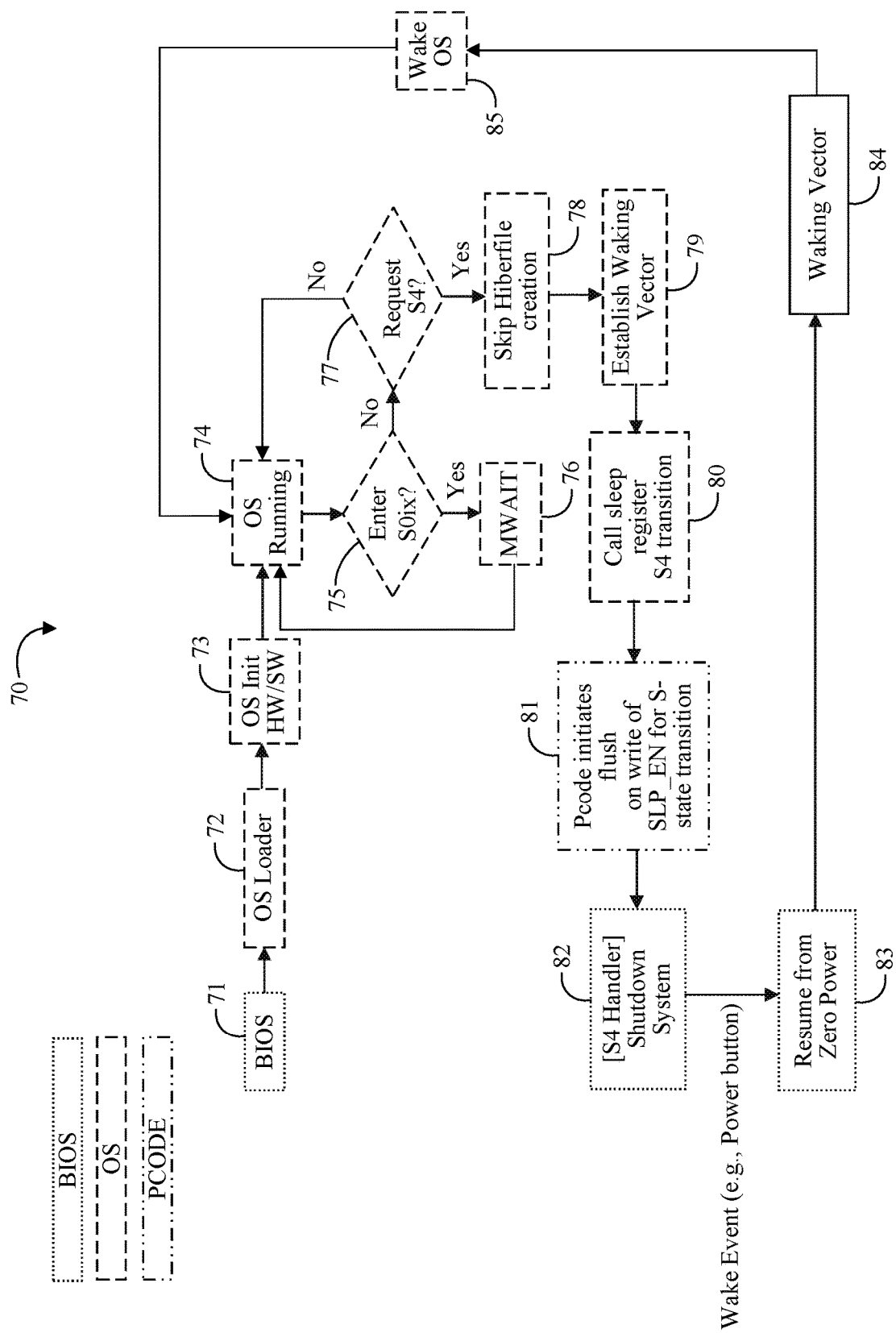
FIG. 6 is a flowchart of another example of a method of waking an operating system according to an embodiment.

Turning now to FIG. 6, an embodiment of a method 70 of waking an OS may include portions performed by a BIOS shown in dotted lines, portions performed by an OS shown in dashed lines, and portions performed by microcode such as processor code (PCODE) shown in lines with alternating dots and dashes. After the BIOS starts at block 71 (e.g., following a hard reset), the BIOS may hand over control to an OS loader at block 72 which may perform OS initialization of the HW/SW at block 73 to place the OS into a run-time state at block 74. While the OS is running at block 74, some action or software trigger may initiate a transition to a low-power or zero-power state. The OS may then determine if the SOix (CS) state should be entered at block 75. If so, a monitor wait (MWAIT) instruction may place the OS in the low-power CS state at block 76 until the monitored condition is detected and the OS resumes running at block 74. Otherwise, the OS may determine if there was a request for S4 at block 77. If not, the OS may continue running at block 74. If so, the OS may skip hiberfile creation at block 78 and establish a waking vector at block 79. The OS may then call sleep register S4 transition at block 80. PCODE may then initiate a flush on write of a sleep enable indicator (e.g., SLP_EN) for the S-state transition at block 81, and the BIOS may call the S4 handler to perform the system shutdown at block 82. After the system shuts down, upon a wake event (e.g., open-lid, power button, etc.), the BIOS may initiate a resume from zero-power at block 83, and jump to the waking vector at block 84 to wake the OS at block 85 and place the OS into the run-time state at block 74.

Figure 7:
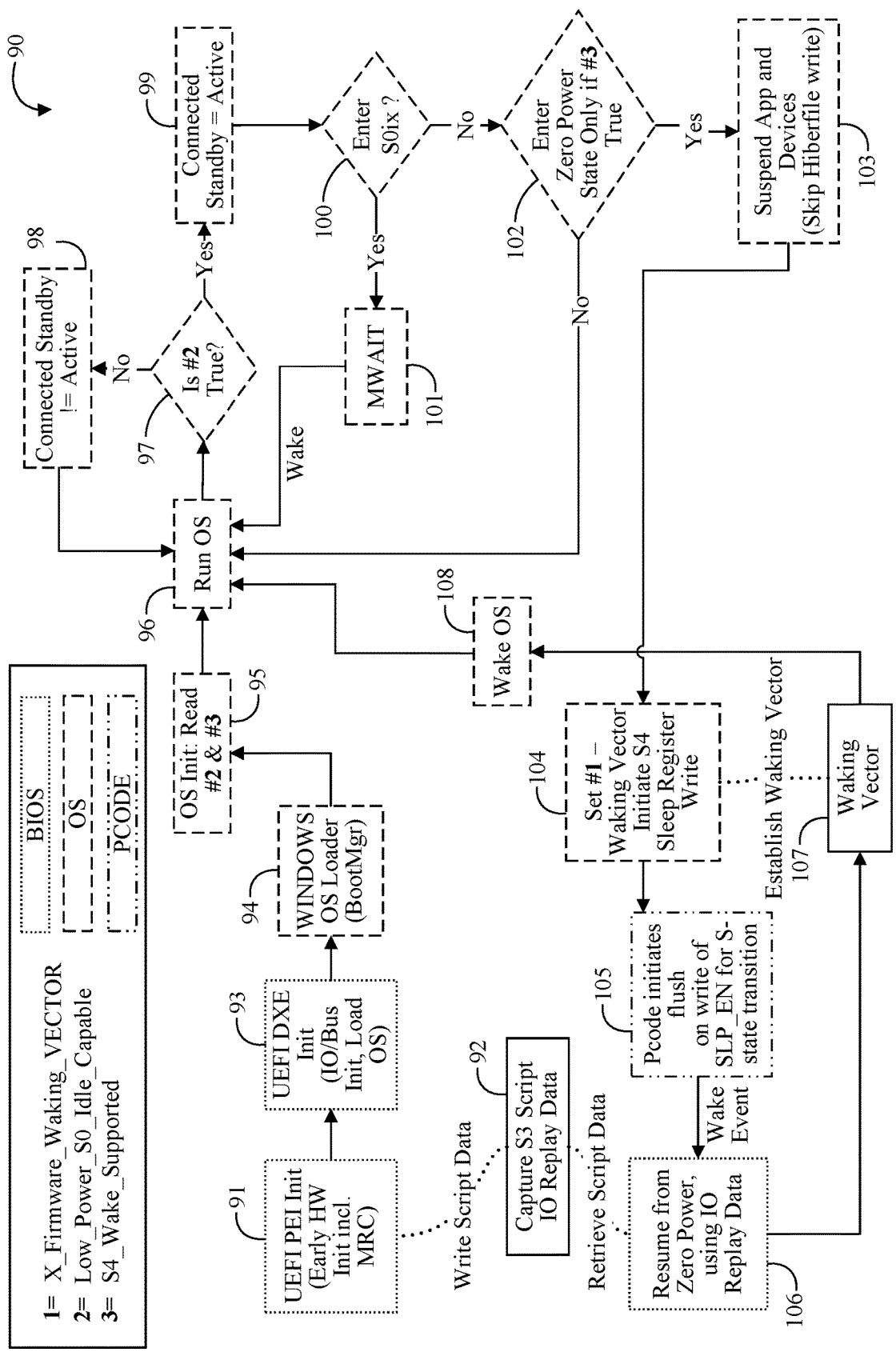
FIG. 7 is a flowchart of another example of a method of waking an operating system according to an embodiment.

Turning now to FIG. 7, an embodiment of a method 90 of waking an OS may include portions performed by a BIOS shown in dotted lines, portions performed by an OS shown in dashed lines, and portions performed by PCODE shown in lines with alternating dots and dashes. The method 90 may include using hints and/or information such as a pointer to a waking vector (e.g., #1=X Firmware_Waking_VECTOR), a flag to indicate if the system is CS-enabled (e.g., #2=Low_Power_S0_Idle_Capable), and a flag to indicate if the system supports low latency wake from the S4 state (e.g., #3=S4_Wake_Supported). When the BIOS starts at block 91 (e.g., following a hard reset), an extensible firmware interface (EFI) (e.g., Unified EFI (UEFI), version 2.7, published May 2017, uefi.org) may include a pre-EFI initialization (PEI) phase (e.g., early HW initialization including MRC) where S3 script data may be written which may be captured at block 92 to keep an IO replay database of HW initialization sequences during normal boot. At block 93, a UEFI driver execution environment (DXE) phase may load drivers and initialize IO, busses, etc. For a MICROSOFT WINDOWS environment, the BIOS/UEFI may hand over control to an OS loader at block 94 which may perform OS initialization of the OS and read values for #2 and #3 at block 95 to place the OS into a run-time state at block 96. While the OS is running at block 96, some action or software trigger may initiate a transition to a low-power or zero-power state. The OS may first determine if #2 is true at block 97. If not, the OS may indicate that CS is not active at block 98, and the OS may continue to run at block 96. If so, the OS may indicate that CS is active at block 99 and then determine if the SOix state should be entered at block 100. If so, a MWAIT instruction may place the OS in the low-power CS state at block 101 until the monitored condition is detected and the OS resumes running at block 96. Otherwise, the OS may determine if #3 is true at block 102. If not, the OS may continue running at block 96. If so, the OS may suspend applications and devices (e.g., skipping hiberfile write) at block 103 and set an address for #1 for the waking vector, initiate S4 sleep register write, and establish a waking vector at block 104. PCODE may then initiate a flush on write of a sleep enable indicator (e.g., SLP_EN) for the S-state transition at block 105, after which the system may shut down. After the system shuts down, upon a wake event (e.g., open-lid, power button, etc.), the BIOS may initiate a resume from zero-power using IO replay data at block 106 (e.g., retrieving the S3 script data), and jump to the waking vector at block 107 to wake the OS at block 108 and place the OS into the run-time state at block 96.

Figure 8:
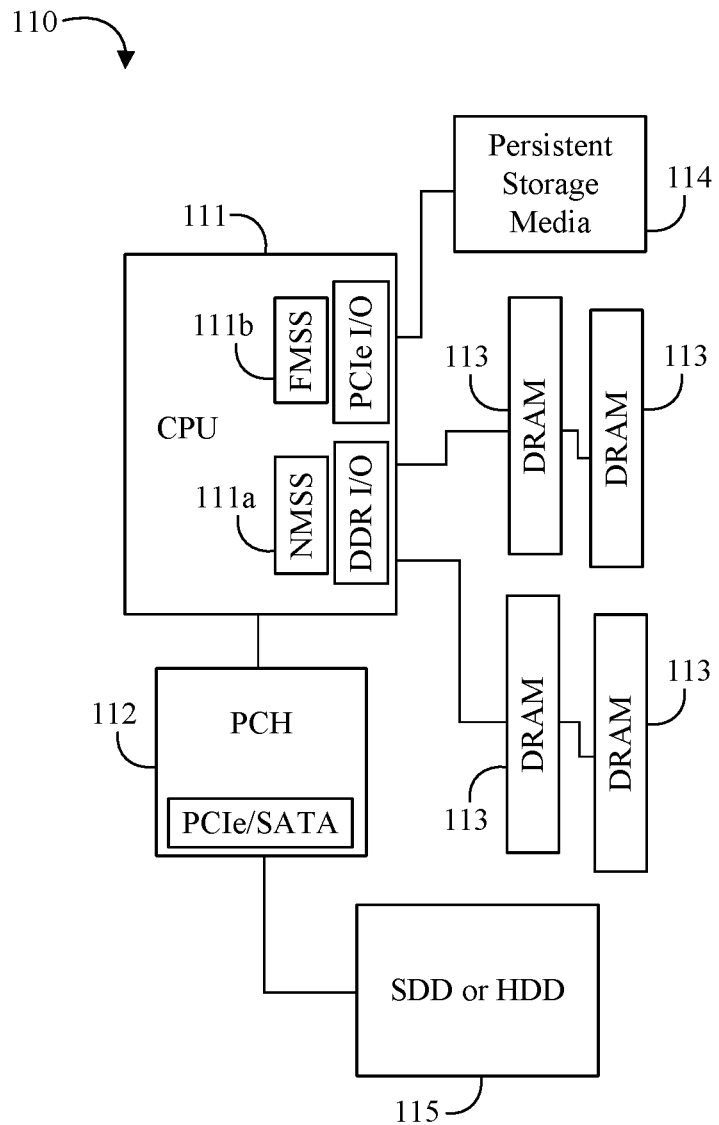
FIG. 8 is a block diagram of another example of an electronic processing system according to an embodiment.

Turning now to FIG. 8, an embodiment of an electronic processing system 110 may include a central processor unit (CPU) 111 coupled to a platform controller hub (PCH) 112. The CPU 111 may include an integrated near memory (NM) controller 111a coupled to one or more DRAM devices 113, and an integrated far memory (FM) controller 111b coupled to one or more NVM devices 114 (e.g., INTEL 3D XPOINT memory media, INTEL OPTANE MEMORY, etc.). The DRAM 113 and NVM 114 may be configured as a 2LM main memory system for the system 110. The PCH 112 may be coupled to one or more mass persistent storage media devices 115 (e.g., such as a SSD or HDD). For example, the technology of the system 110 may include a combination of 3D XPOINT memory media, INTEL memory and/or storage controllers, INTEL INTERCONNECT IP, and INTEL software which may be referred to as INTEL OPTANE TECHNOLOGY.

Some embodiments of the system 110 may include flags and/or additional information to enable various aspects of the zero-power low latency boot flow. Some embodiments may utilize and/or repurpose flags and/or information from other boot flows. For example, some systems may include a firmware waking vector (FWV) value as specified by ACPI which may be used by the S3 (standby) state. In some embodiments, the BIOS may establish a zero'ed FWV value that may be exposed to the OS. If during a S4 resume, the BIOS determines that the FWV value has changed from its zero'ed state to something other than that, the BIOS may use the FWV value to wake the OS (e.g., if and only if the BIOS knows or determines that the platform is 2LM and S4 wake-enabled). For example, the OS may advantageously establish a waking vector when going into the S4 state (normally only done for the S3 state) and set the FWV value to a physical memory address for the zero-power waking vector.

Additionally, in some embodiments, the BIOS may expose a flag/bit that the OS may use to determine if the machine is in fact a 2LM machine (e.g., including NVM in the 2LM). Normally a 2LM machine may be software invisible. Some embodiments may use this platform hint to make a policy decision that may be included in the boot flow. For example, the OS may normally have a choice during operation that if the machine was idle, the machine may go into an SOix mode to save power. However, normally when a thermal or battery event occurs, the OS may go into an S4 mode to go into a zero-power state. By using the hint provided by the platform, the OS may then alternately choose to establish a waking vector and communicate the choice back to the BIOS by updating the standard FWV value (normally used by S3). Advantageously, the flags/information provided by some embodiments of a 2LM-type system may provide an improved or optimal mode that may resume very quickly from a zero-power state.

Figure 9A:
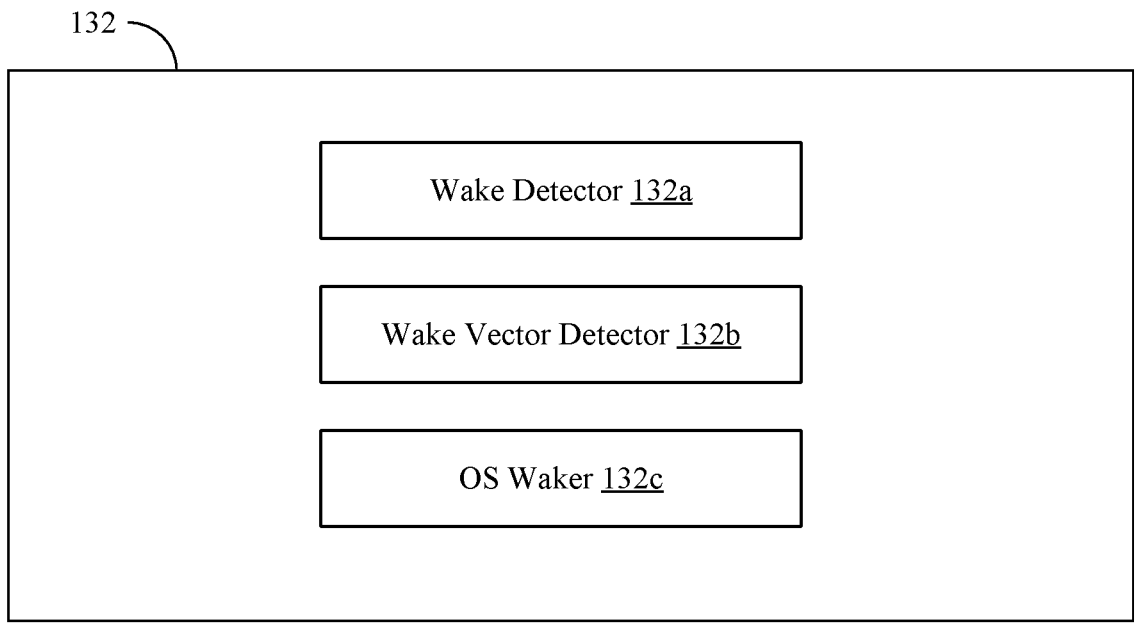
FIGS. 9A and 9B are block diagrams of examples of zero-power low latency boot apparatuses according to embodiments.

FIG. 9A shows a zero-power low latency boot apparatus 132 (132a-132g) that may implement one or more aspects of the method 28 (FIGS. 3A to 3C), the method 50 (FIG. 5), the method 70 (FIG. 6), and/or the method 90 (FIG. 7). The zero-power low latency boot apparatus 132, which may include logic instructions, configurable logic, fixed-functionality hardware logic, may be readily substituted for the logic 13 (FIG. 1), and/or the boot logic 43, already discussed. A wake detector 132a may include technology to detect a wake event. A wake vector detector 132b may include technology to detect if a zero-power wake vector is available. An OS waker 132c may include technology to wake an OS using the zero-power wake vector. For example, the wake detector 132a may include technology to determine if a wake event corresponds to a zero-power state. The wake vector detector 132b may include technology to determine if a wake vector is available. The OS waker 132c may include technology to wake the OS from the zero-power state based on the wake vector, if the wake vector is determined to be available. In some embodiments, the OS waker 132c may be configured to replay an initialization sequence from the zero-power state, if the wake vector is determined to be available. In some embodiments, the wake vector detector 132b may be further configured to determine if a system memory includes a multi-level memory with at least one level of NVM. For example, the OS waker 132c may also be configured to receive an indication of a transition to a zero-power state, and to create the wake vector, if the system memory is determined to include the multi-level memory with at least one level of NVM. In some embodiments, the OS waker 132c may be further configured to initiate a flush of volatile memory to the NVM of the multi-level memory based on the received indication of the transition to the zero-power state. For example, the NVM may include PCM.

Figure 9B:
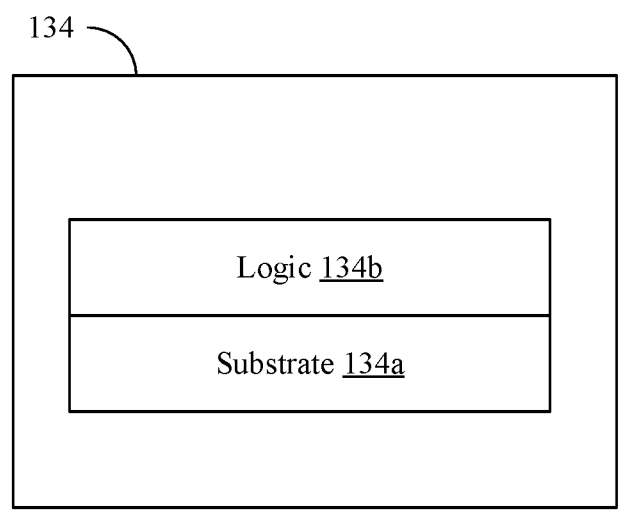

Turning now to FIG. 9B, zero-power low latency boot apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 28 (FIGS. 3A to 3C), the method 50 (FIG. 5), the method 70 (FIG. 6), and/or the method 90 (FIG. 7). Thus, the logic 134b may determine if a wake event corresponds to a zero-power state, determine if a wake vector is available, and wake an OS from the zero-power state based on the wake vector, if the wake vector is determined to be available. In some embodiments, the logic 134b may replay an initialization sequence from the zero-power state, if the wake vector is determined to be available. In some embodiments, the logic 134b may also determine if a system memory includes a multi-level memory with at least one level of NVM. For example, the logic 134b may also receive an indication of a transition to a zero-power state, and create the wake vector, if the system memory is determined to include the multi-level memory with at least one level of NVM. In some embodiments, the logic 134b may initiate a flush of volatile memory to the NVM of the multi-level memory based on the received indication of the transition to the zero-power state. For example, the NVM may include PCM. In one example, the apparatus 134 is a semiconductor die, chip and/or package.

Figure 10:
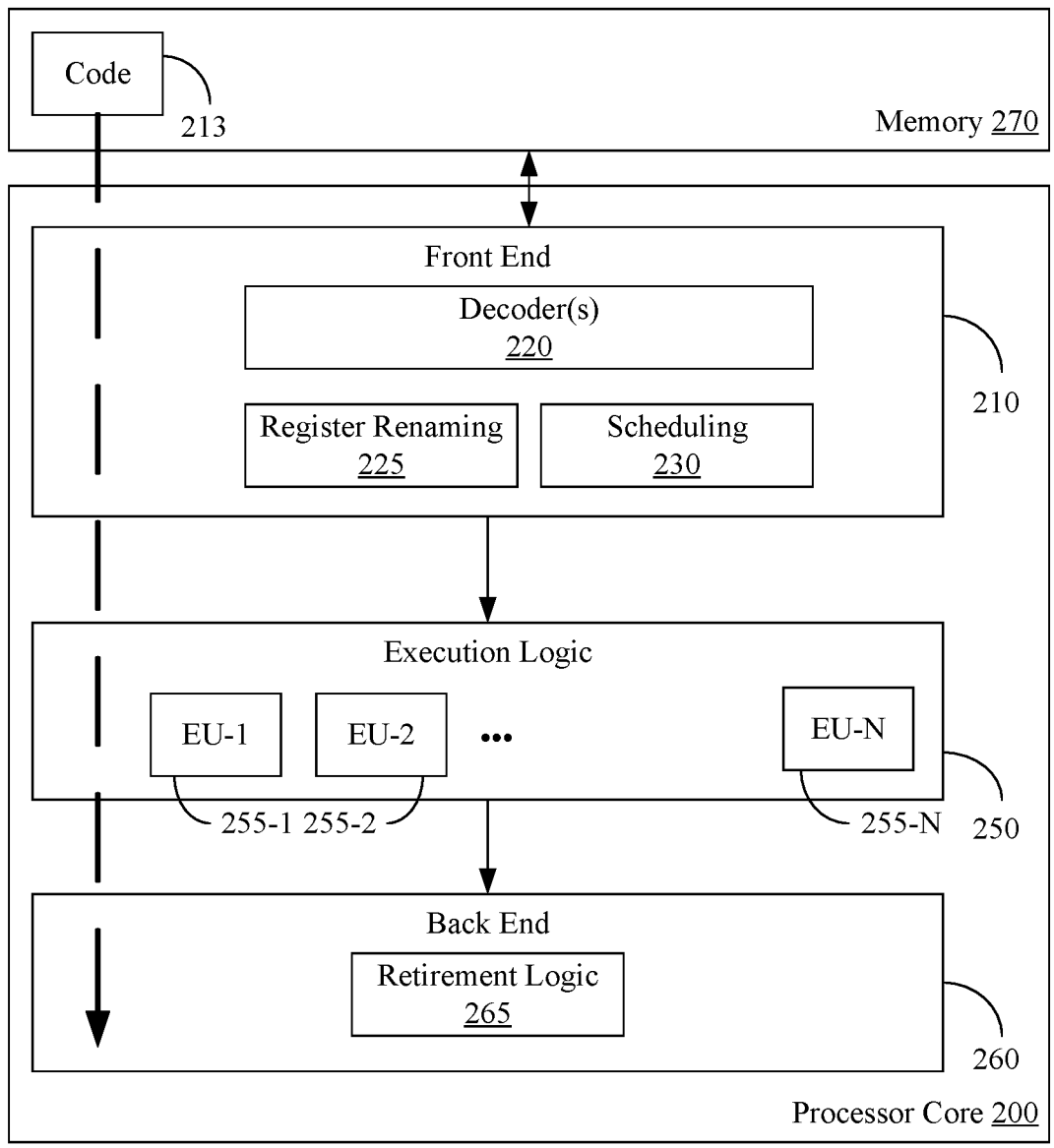
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 28 (FIGS. 3A to 3C), the method 50 (FIG. 5), the method 70 (FIG. 6), and/or the method 90 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
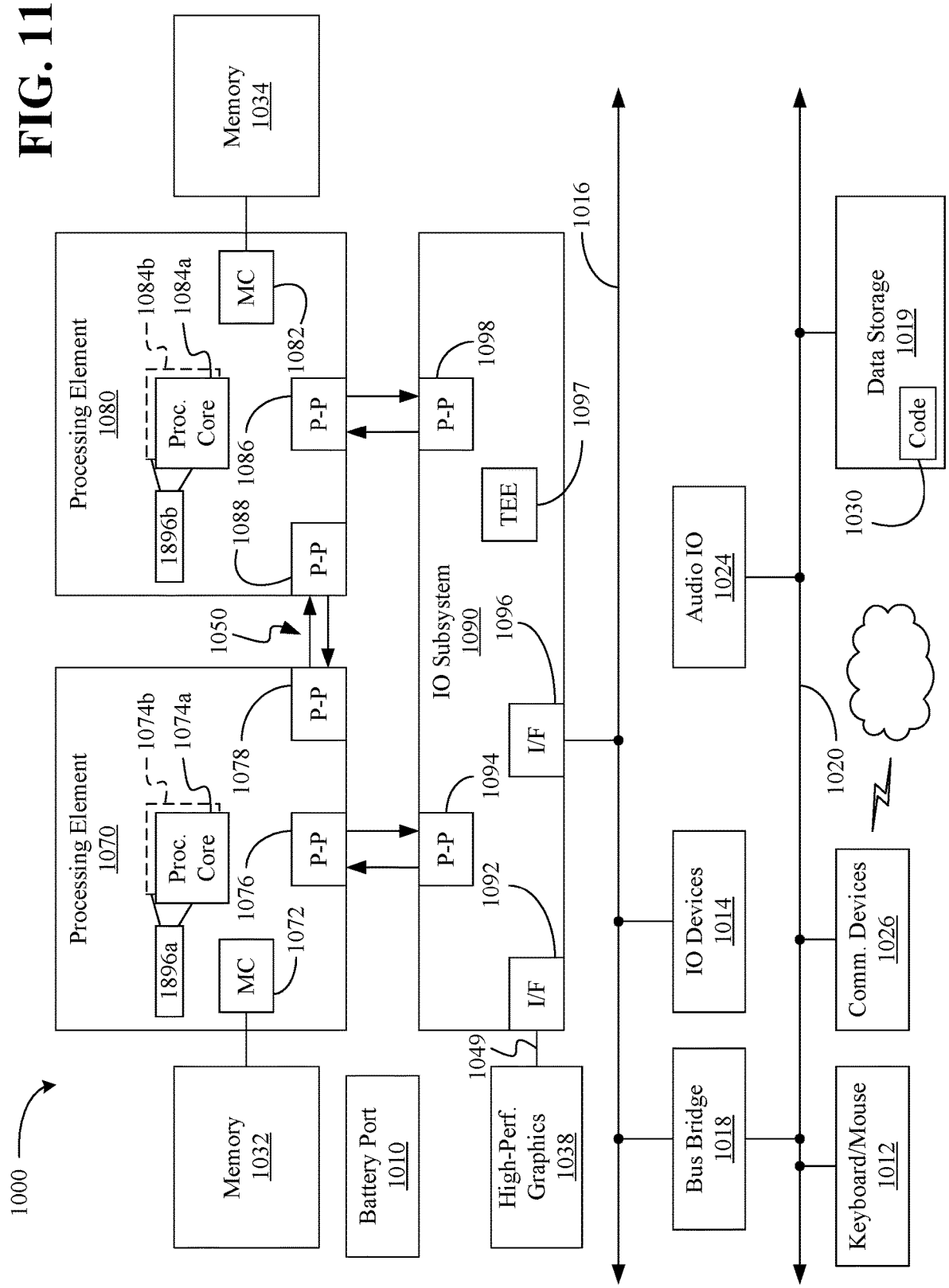
FIG. 11 is a block diagram of an example of a system according to an embodiment.

Referring now to FIG. 11, shown is a block diagram of a system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 28 (FIGS. 3A to 3C), the method 50 (FIG. 5), the method 70 (FIG. 6), and/or the method 90 (FIG. 7), already discussed, and may be similar to the code 213 (FIG. 10), already discussed. Further, an audio I/O 1024 may be coupled to second bus 1020.

Note that other embodiments are contemplated. For example, instead of the point-to-point architecture of FIG. 11, a system may implement a multi-drop bus or another such communication topology.

Additional Notes and Examples:

Example 1 may include an electronic processing system, comprising a processor, memory communicatively coupled to the processor, and logic communicatively coupled to the processor to determine if a wake event corresponds to a wake from a zero-power state, determine if a run-time state is valid to wake from the zero-power state, and wake from the zero-power state to the run-time state if the run-time state is determined to be valid.

Example 2 may include the system of Example 1, wherein the logic is further to determine if a wake vector is available, and wake an operating system from the zero-power state based on the wake vector, if the wake vector is determined to be available.

Example 3 may include the system of Example 2, wherein the logic is further to replay an initialization sequence from the zero-power state, if the wake vector is determined to be available.

Example 4 may include the system of Example 2, wherein the logic is further to determine if the memory includes a multi-level memory with at least one level of non-volatile memory.

Example 5 may include the system of Example 4, wherein the logic is further to receive an indication of a transition to a zero-power state, and create the wake vector, if the memory is determined to include the multi-level memory with at least one level of non-volatile memory.

Example 6 may include the system of Example 5, wherein the logic is further to initiate a flush of volatile memory to the non-volatile of the multi-level memory based on the received indication of the transition to the zero-power state.

Example 7 may include the system of any of Examples 4 to 6, wherein the nonvolatile memory comprises phase change memory.

Example 8 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine if a wake event corresponds to a zero-power state, determine if a run-time state is valid to wake from the zero-power state, and wake from the zero-power state to the run-time state if the run-time state is determined to be valid.

Example 9 may include the apparatus of Example 8, wherein the logic is further to determine if a wake vector is available, and wake an operating system from the zero-power state based on the wake vector, if the wake vector is determined to be available.

Example 10 may include the apparatus of Example 9, wherein the logic is further to replay an initialization sequence from the zero-power state, if the wake vector is determined to be available.

Example 11 may include the apparatus of Example 9, wherein the logic is further to determine if a system memory includes a multi-level memory with at least one level of non-volatile memory.

Example 12 may include the apparatus of Example 11, wherein the logic is further to receive an indication of a transition to a zero-power state, and create the wake vector, if the system memory is determined to include the multi-level memory with at least one level of non-volatile memory.

Example 13 may include the apparatus of Example 12, wherein the logic is further to initiate a flush of volatile memory to the non-volatile memory of the multi-level memory based on the received indication of the transition to the zero-power state.

Example 14 may include the apparatus of any of Examples 11 to 13, wherein the non-volatile memory comprises phase change memory.

Example 15 may include the apparatus of any of Examples 8 to 14, wherein the logic coupled to the one or more substrates includes transistor channel regions that are positioned within the one or more substrates.

Example 16 may include a method of waking an operating system, comprising determining if a wake event corresponds to a zero-power state, determining if a run-time state is valid to wake from the zero-power state, and waking from the zero-power state to the run-time state if the run-time state is determined to be valid.

Example 17 may include the method of Example 16, further comprising determining if a wake vector is available, and waking an operating system from the zero-power state based on the wake vector, if the wake vector is determined to be available.

Example 18 may include the method of Example 17, further comprising replaying an initialization sequence from the zero-power state, if the wake vector is determined to be available.

Example 19 may include the method of Example 17, further comprising determining if a system memory includes a multi-level memory with at least one level of non-volatile memory.

Example 20 may include the method of Example 19, further comprising receiving an indication of a transition to a zero-power state, and creating the wake vector, if the system memory is determined to include the multi-level memory with at least one level of non-volatile memory.

Example 21 may include the method of Example 20, further comprising initiating a flush of volatile memory to the non-volatile memory of the multi-level memory based on the received indication of the transition to the zero-power state.

Example 22 may include the method of any of Examples 19 to 21, wherein the non-volatile memory comprises phase change memory.

Example 23 may include at least one computer readable medium, comprising a set of instructions, which when executed by a computing device, cause the computing device to determine if a wake event corresponds to a zero-power state, determine if a run-time state is valid to wake from the zero-power state, and wake from the zero-power state to the run-time state if the run-time state is determined to be valid.

Example 24 may include the at least one computer readable medium of Example 23, comprising a further set of instructions, which when executed by the computing device, cause the computing device to determine if a wake vector is available, and wake an operating system from the zero-power state based on the wake vector, if the wake vector is determined to be available.

Example 25 may include the at least one computer readable medium of Example 24, comprising a further set of instructions, which when executed by the computing device, cause the computing device to replay an initialization sequence from the zero-power state, if the wake vector is determined to be available.

Example 26 may include the at least one computer readable medium of Example 24, comprising a further set of instructions, which when executed by the computing device, cause the computing device to determine if a system memory includes a multi-level memory with at least one level of non-volatile memory.

Example 27 may include the at least one computer readable medium of Example 26, comprising a further set of instructions, which when executed by the computing device, cause the computing device to receive an indication of a transition to a zero-power state, and create the wake vector, if the system memory is determined to include the multi-level memory with at least one level of non-volatile memory.

Example 28 may include the at least one computer readable medium of Example 27, comprising a further set of instructions, which when executed by the computing device, cause the computing device to initiate a flush of volatile memory to the non-volatile memory of the multi-level memory based on the received indication of the transition to the zero-power state.

Example 29 may include the at least one computer readable medium of any of Examples 26 to 28, wherein the non-volatile memory comprises phase change memory.

Example 30 may include a computing apparatus, comprising means for determining if a wake event corresponds to a zero-power state, means for determining if a run-time state is valid to wake from the zero-power state, and means for waking from the zero-power state to the run-time state if the run-time state is determined to be valid.

Example 31 may include the apparatus of Example 30, further comprising means for determining if a wake vector is available, and means for waking an operating system from the zero-power state based on the wake vector, if the wake vector is determined to be available.

Example 32 may include the apparatus of Example 31, further comprising means for replaying an initialization sequence from the zero-power state, if the wake vector is determined to be available.

Example 33 may include the apparatus of Example 31, further comprising means for determining if a system memory includes a multi-level memory with at least one level of non-volatile memory.

Example 34 may include the apparatus of Example 33, further comprising means for receiving an indication of a transition to a zero-power state, and means for creating the wake vector, if the system memory is determined to include the multi-level memory with at least one level of non-volatile memory.

Example 35 may include the apparatus of Example 34, further comprising means for initiating a flush of volatile memory to the non-volatile memory of the multi-level memory based on the received indication of the transition to the zero-power state.

Example 36 may include the apparatus of any of Examples 33 to 35, wherein the non-volatile memory comprises phase change memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
determine if a zero-power state is requested,
create a hiberfile in response to a request for the zero-power state and in response to a determination that wake from the zero-power state is not supported,
skip the creation of the hiberfile and create a wake vector for the zero-power state in response to the request for the zero-power state and in response to a determination that wake from the zero-power state is supported, wherein the wake vector includes information related to a transition of an operating system (OS) of the electronic processing system to the zero-power state,
determine if a wake event corresponds to a wake from the zero-power state of the OS,
determine if a run-time state is valid to wake the OS from the zero-power state, and
wake the OS from the zero-power state to the run-time state in response to a determination that the run-time state is valid based on the wake vector when the wake vector is determined to be available and based on the hiberfile when the wake vector is determined to be not available.

2. The electronic processing system of claim 1, wherein the logic is further to:
determine if the wake vector is available.

3. The electronic processing system of claim 2, wherein the logic is further to:
replay the initialization sequence from the zero-power state, if the wake vector is determined to be available.

4. The electronic processing system of claim 2, wherein the logic is further to:
determine if the memory includes a multi-level memory with at least one level of non-volatile memory.

5. The electronic processing system of claim 4, wherein the logic is further to:
receive an indication of a transition to the zero-power state; and
create the wake vector, if the memory is determined to include the multi-level memory with at least one level of non-volatile memory.

6. The electronic processing system of claim 5, wherein the logic is further to:
initiate a flush of volatile memory to the at least one level of non-volatile memory of the multi-level memory based on the received indication of the transition to the zero-power state.

7. The electronic processing system of claim 4, wherein the at least one level of non-volatile memory comprises phase change memory.

8. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
determine if a zero-power state is requested,
create a hiberfile in response to a request for the zero-power state and in response to a determination that wake from the zero-power state is not supported,
skip the creation of the hiberfile and create a wake vector for the zero-power state in response to the request for the zero-power state and in response to a determination that wake from the zero-power state is supported, wherein the wake vector includes information related to a transition of an operating system (OS) of an electronic processing system to the zero-power state, determine if a wake event corresponds to a wake from the zero-power state of the OS, determine if a run-time state is valid to wake from the zero-power state, and wake the OS from the zero-power state to the run-time state in response to a determination that the run-time state is valid based on the wake vector when the wake vector is determined to be available and based on the hiberfile when the wake vector is determined to be not available.

9. The semiconductor package apparatus of claim 8, wherein the logic is further to:

determine if the wake vector is available.

10. The semiconductor package apparatus of claim 9, wherein the logic is further to:

replay the initialization sequence from the zero-power state, if the wake vector is determined to be available.

11. The semiconductor package apparatus of claim 9, wherein the logic is further to:

determine if a system memory includes a multi-level memory with at least one level of non-volatile memory.

12. The semiconductor package apparatus of claim 11, wherein the logic is further to:

receive an indication of a transition to the zero-power state; and create the wake vector, if the system memory is determined to include the multi-level memory with at least one level of non-volatile memory.

13. The semiconductor package apparatus of claim 12, wherein the logic is further to:

initiate a flush of volatile memory to the at least one level of non-volatile memory of the multi-level memory based on the received indication of the transition to the zero-power state.

14. The semiconductor package apparatus of claim 11, wherein the at least one level of non-volatile memory comprises phase change memory.

15. The semiconductor package apparatus of claim 8, wherein the logic coupled to the one or more substrates includes transistor channel regions that are positioned within the one or more substrates.

16. A method of waking an operating system, comprising:

determining if a zero-power state is requested;

creating a hiberfile in response to a request for the zero-power state and in response to a determination that wake from the zero-power state is not supported;

skipping the creation of the hiberfile and create a wake vector for the zero-power state in response to the request for the zero-power state and in response to a determination that wake from the zero-power state is supported, wherein the wake vector includes information related to a transition of an operating system (OS) of an electronic processing system to the zero-power state;

determining if a wake event corresponds to a wake from the zero-power state of the OS;

determining if a run-time state is valid to wake from the zero-power state; and waking the OS from the zero-power state to the run-time state in response to a determination that the run-time state is valid based on the wake vector when the wake vector is determined to be available and based on the hiberfile when the wake vector is determined to be not available.

17. The method of claim 16, further comprising:

determining if the wake vector is available.

18. The method of claim 17, further comprising:

replaying the initialization sequence from the zero-power state, if the wake vector is determined to be available.

19. The method of claim 17, further comprising:

determining if a system memory includes a multi-level memory with at least one level of non-volatile memory.

20. The method of claim 19, further comprising:

receiving an indication of a transition to the zero-power state; and creating the wake vector, if the system memory is determined to include the multi-level memory with at least one level of non-volatile memory.

21. The method of claim 20, further comprising:

initiating a flush of volatile memory to the at least one level of non-volatile memory of the multi-level memory based on the received indication of the transition to the zero-power state.

22. The method of claim 19, wherein the at least one level of non-volatile memory comprises phase change memory.

* * * * *